United States Patent [19]

Carney et al.

[11] Patent Number: 5,393,720
[45] Date of Patent: Feb. 28, 1995

[54] ALPHA-OLEFIN POLYMERIZATION CATALYSTS COMPRISING SUPPORTED CYCLOPENTADIENYL GROUP 6B METAL OXO, THIO, IMIDO AND PHOSPHIDO COMPOUNDS AND PROCESS FOR POLYMERIZING ALPHA-OLEFINS

[75] Inventors: Michael J. Carney; David L. Beach, both of Kingwood, Tex.

[73] Assignee: Chevron Chemical Company, San Ramon, Calif.

[21] Appl. No.: 259,202

[22] Filed: Jun. 13, 1994

Related U.S. Application Data

[63] Continuation of Ser. No. 973,129, Nov. 6, 1992, Pat. No. 5,320,996.

[51] Int. Cl.$^6$ ............................................. C08F 4/69
[52] U.S. Cl. ................................... 502/117; 502/103; 502/113; 502/120; 502/152; 502/155; 526/114
[58] Field of Search ............... 502/103, 113, 117, 120, 502/152, 155

[56] References Cited

U.S. PATENT DOCUMENTS 5,169,815  12/1992  Dawkins ........................... 502/152

*Primary Examiner*—Joseph L. Schofer
*Assistant Examiner*—David Wu
*Attorney, Agent, or Firm*—C. D. Holland; R. J. Sheridan

[57] ABSTRACT

Disclosed is a catalyst system for the homopolymerization and copolymerization of alpha-olefins having 2–8 carbon atoms, said catalyst system comprising a cyclopentadienyl Group 6$b$ metal compound having at least one oxo, thio, imido or phosphido group bonded directly to the Group 6$b$ metal, and at least one organic radical bonded to the Group 6$b$ metal through a carbon atom, said Group 6$b$ metal compound being supported on an inorganic support. The catalyst system may also contain a Group 2 or Group 3 metal alkyl compound cocatalyst.

22 Claims, No Drawings

ALPHA-OLEFIN POLYMERIZATION CATALYSTS COMPRISING SUPPORTED CYCLOPENTADIENYL GROUP 6B METAL OXO, THIO, IMIDO AND PHOSPHIDO COMPOUNDS AND PROCESS FOR POLYMERIZING ALPHA-OLEFINS

This application is a continuation of U.S. Ser. No. 07/973,129, filed Nov. 6, 1992, now U.S. Pat. No. 5,320,996.

FIELD OF THE INVENTION

The present invention relates to catalyst systems for polymerizing alpha-olefins and processes for polymerizing alpha-olefins using such catalysts.

BACKGROUND OF THE INVENTION

Chromium-based catalysts are used in the commercial polymerization of small alpha-olefins such as ethylene and propylene. One such catalyst is prepared by depositing chromocene (bis(cyclopentadienyl) chromium (II)) on an inorganic metal oxide support, as disclosed in British Patent No. 1,253,063 to Karapinka. U.S. Pat. No. 4,015,059, issued Mar. 29, 1977 to Karol, describes the use of bis(indenyl)- and bis(flourenyl)-chromium (II) compounds supported on activated inorganic oxide supports as catalysts for the polymerization of ethylene.

U.S. Pat. No. 4,530,914, issued Jul. 23, 1985 to Ewen et al., discloses a catalyst system for the polymerization of alpha-olefins which comprises two or more metallocenes, each having different propagation and termination rate constants, and aluminoxane. The metallocenes are cyclopentadienyl derivatives of a transition metal of Group 4b, 5b, and 6b metals of the Periodic Table. They are described by the formulas $(C_5R'_m)_pR''_s(C_5R'_m)MeQ_{3-p}$ and $R''_s(C_5R'_m)_2MeQ'$ where $(C_5R'_m)$ is a cyclopentadienyl or substituted cyclopentadienyl, each $R'$ is hydrogen or a hydrocarbyl radical, $R''$ is an alkylene radical, a dialkyl germanium or silicon or an alkyl phosphine or amine radical bridging two $(C_5R'_m)$ rings, $Q$ is a hydrocarbon radical, Me is a Group 4b, 5b, or 6b metal, s is 0 or 1, p is 0, 1, or 2; when p=0, s=0; m is 4 when s is 1 and m is 5 when s is 0.

U.S. Pat. No. 4,939,217, issued Jul. 3, 1990 to Stricklen, also discloses a process for polymerizing olefins where the polymerization is conducted in the presence of hydrogen, and a catalyst system is used which contains aluminoxane and at least two metallocenes, each having different olefin polymerization termination rate constants. The metallocenes disclosed are similar to those described in aforementioned U.S. Pat. No. 4,530,914.

U.S. Pat. No. 4,975,403, issued Dec. 4, 1990 to Ewen, discloses a catalyst system for use in the polymerization of olefins. The catalyst system includes at least two different chiral, stereo-rigid metallocene catalysts of the formula $R''(C_5(R')_4)_2MeQ_p$ (where Me is a Group 4b, 5b or 6b metal and $(C_5(R')_4)$ is a cyclopentadienyl or substituted cyclopentadienyl ring) and an aluminum compound.

Canadian Patent Application No. 2,000,567, published Apr. 13, 1990, discloses a process for producing polyethylene using a composite catalyst made up of a solid catalyst component typified by a selected chromium compound, a modified aluminum compound typified by a trialkylaluminum, and an alkylaluminum alkoxide compound. The chromium compound may be chromium oxide, and the modified aluminum compound may be the reaction product of an organoaluminum compound and water.

European Patent Application Publication No. 416,784 by Dawkins, published Mar. 13, 1991, discloses an olefin polymerization catalyst obtainable by depositing on a dry inorganic oxide support a mononuclear chromium complex to produce a catalyst precursor and thereafter by thermally activating the catalyst precursor. The mononuclear chromium complex is representable by the general formula:

$$Z-CR-L_x$$

wherein Z is a cyclopentadienyl ligand substituted with 4 or 5 hydrocarbon groups containing 1 to 3 carbon atoms; x is an integer from 1 to 4, and L is either a four- or five-substituted cyclopentadienyl ligand, or $(CO)_3 R$ in which R is H, methyl or ethyl.

The catalyst is used to polymerize olefins, particularly ethylene optionally with $C_3$-$C_8$ alpha-olefins. The catalyst is said to produce polyolefins having a relatively high molecular weight and a broad molecular weight distribution.

European patent Application Publication No. 416,785 by Dawkins, published Mar. 13, 1991, also describes an olefin polymerization catalyst obtainable by depositing on a dry inorganic oxide at least one mononuclear chromium complex having the general formula:

$$Z-Cr-L$$

wherein Z is a cyclopentadienyl ligand substituted with 4 or 5 hydrocarbyl groups containing 1 to 3 carbon atoms; and L is one or more hydrocarbyl ligands which are sufficiently reactive to enable the complex to react with the inorganic oxide without thermal activation.

The catalyst can be used without thermal activation for polymerizing olefins, particularly ethylene optionally with $C_3$-$C_8$ alpha-olefins. The catalyst is said to produce polyolefins having a broad molecular weight distribution.

U.S. Pat. No. 4,424,139, issued Jan. 3, 1984 to McDaniel et al., discloses a catalyst system containing (a) a catalyst comprising a bis-(cyclopentadienyl)-chromium (II) compound and a phosphate-containing support and (b) a cocatalyst selected from trihydrocarbyl borane compounds and aluminum compounds. These catalyst are said to be useful as olefin polymerization catalysts, and are said to be capable of giving narrow molecular weight distribution polymer.

A tetrameric chromium (II) compound useful as an alphaolefin polymerization catalyst is disclosed in U.S. Pat. No. 4,806,513, issued Feb. 21, 1989 to McDaniel et al. The compound, octakis-($\mu$-trimethylsilylmethyl)tetrachromium, is not, however, cyclopentadienyl-containing.

U.S. Pat. No. 4,587,227, issued May 6, 1986 to Smith et al., discloses octakis-($\mu$-trimethylsilylmethyl)tetrachromium on an inorganic oxide as a catalyst to make linear low density polyethylene with specific short chain branching.

SUMMARY OF THE INVENTION

It has now been discovered that when cyclopentadienyl Group 6b metal compounds having at least one oxo, thio, imido or phosphido group bonded directly to the Group 6b metal and at least one organic radical bonded to the Group 6b metal through a carbon atom are supported on an inorganic support, high productivity alpha-olefin polymerization catalysts are produced. In addition, the use of a cocatalyst improves the productivity of many of these compounds. Also, these catalysts produce linear polyethylenes.

In accordance with the present invention, there is provided a catalyst system for the homopolymerization and copolymerization of alpha-olefins having 2–8 carbon atoms, said catalyst system comprising a cyclopentadienyl Group 6b metal compound having at least one oxo, thio, imido or phosphido group bonded directly to the Group 6b metal, and at least one organic radical bonded to the Group 6b metal through a carbon atom, said Group 6b metal compound being supported on an inorganic support.

Also provided in accordance with this invention is a catalyst system for the homopolymerization and copolymerization of alpha-olefins having 2–8 carbon atoms, said catalyst system comprising (a) a cyclopentadienyl Group 6b metal compound having at least one oxo, thio, imido or phosphido group bonded directly to the Group 6b metal, and at least one organic radical bonded to the Group 6b metal through a carbon atom; and (b) a cocatalyst selected from Group 2 or 3 metal alkyl compounds.

Further provided in accordance with the present invention is a process for the homopolymerization or copolymerization of alpha-olefins having 2–8 carbon atoms comprising polymerizing said alpha-olefin, or copolymerizing two or more alpha-olefins in the presence of a catalyst system comprising a cyclopentadienyl Group 6b metal compound having at least one oxo, thio, imido or phosphido group bonded directly to the Group 6b metal, and at least one organic radical bonded to the Group 6b metal through a carbon atom, said group 6b metal compound being supported on an inorganic support.

The present invention also provides a process for the homopolymerization or copolymerization of alpha-olefins comprising polymerizing said alpha-olefin, or copolymerizing two or more alpha-olefins in the presence of a catalyst system comprising (a) a cyclopentadienyl Group 6b metal compound having at least one oxo, thio, imido or phosphido group bonded directly to the Group 6b metal, and at least one organic radical bonded to the Group 6b metal through a carbon atom, said group 6b metal compound being supported on an inorganic support, and (b) a Group 2 or 3 metal alkyl compound cocatalyst.

In the above catalyst systems and processes, chromium is a preferred Group 6b metal, silica, aluminum phosphate and alumina aluminum phosphate are preferred supports, and aluminoxanes and trialkylaluminum compounds are preferred Group 2 or 3 metal alkyl compounds.

Among other factors, the present invention is based on the discovery that the catalyst systems of the present invention have high activity (in terms of amount of polymer produced per amount of chromium per hour), produce ethylene homopolymers with a high degree of linearity, and produce polymers with a variety of molecular weight distributions.

DETAILED DESCRIPTION OF PREFERRED EMBODIMENTS

The present invention provides catalyst systems for use in the polymerization (either homopolymerization or copolymerization) of $C_2$–$C_8$ alpha-olefins, including ethylene, propylene, 1-butene, 1-hexene, 4-methyl-1-pentene, and 1-octene.

It has quite surprisingly been found that, even though the productivity of many cyclopentadienyl Group 6b metal compounds is quite low when employed as catalyst in the homogeneous polymerization of alpha-olefins, when these compounds are supported on an inorganic support, such as a solid inorganic metal oxide or inorganic phosphate, their productivity increases dramatically, especially when cocatalysts are used.

While the catalyst systems of the present invention can be used to polymerize a variety of alpha-olefins, they are especially useful in the polymerization of ethylene. These catalysts produce linear polyethylene, i.e., polyethylene with substantially no side chain branches, in high yield. In addition, the catalyst systems of this invention produce polyethylene with a variety of molecular weight distributions, depending on the support used.

The catalyst systems of the present invention comprise at least one cyclopentadienyl Group 6b metal compound having at least one oxo, thio, imido or phosphido group bonded directly to the Group 6b metal, and at least one organic radical bonded to the Group 6b metal through a carbon atom, and which is catalytically active when deposited on an inorganic support, such as a solid inorganic metal oxide or inorganic metal phosphate. As used herein, the term "cyclopentadienyl" refers to unsubstituted cyclopentadienyl as well as substituted derivatives of cyclopentadienyl in which the cyclopentadienyl ring contains one or more substituents which do not interfere with the Group 6b metal compound's ability to function as an alpha-olefin polymerization catalyst. Examples of substituted cyclopentadienyl include pentamethylcyclopentadienyl, ethyltetramethylcyclopentadienyl, methylcyclopentadienyl, t-butylcyclopentadienyl, and pentaphenylcyclopentadienyl, as well as compounds where the substituent forms a multi-cyclic ring with the cyclopentadienyl ring. Examples of these multi-cyclic rings include indenyl and fluorenyl rings. For the sake of simplicity, the abbreviation Cp* will be used herein to refer to pentamethylcyclopentadienyl, and the abbreviation Cp' will be used herein to refer to ethyltetramethylcyclopentadienyl. Cp* is a preferred cyclopentadienyl group as it stabilizes the organometallic compound of this invention.

The Group 6b metal compounds useful in the present invention include compounds wherein the metal is chromium, molybdenum or tungsten. Compounds in which the metal is chromium are preferred. The Group 6b metal atom in the compound has an oxidation state of +4, +5, or +6.

The Group 6b metal compounds useful in this invention have at least one oxo, thio, imido or phosphido group(s) bonded directly to the Group 6b metal. As used herein, the term "oxo" refers to divalent radicals having the formula =O or —O— (i.e., the oxygen atom is bonded exclusively to the Group 6b metal), the term "thio" refers to divalent radicals having the formulas =S or —S— (i.e., the sulfur atom(s) is bonded exclusively to the Group 6b metal), the term "imido" refers to divalent radicals having the formula =N—R or =N—H, and the term "phosphido" refers to divalent radicals having the formula =P—R or =P—H where R is as defined below.

The Group 6b metal compounds also have, in addition to one cyclopentadienyl group, at least one organic radical bonded to each Group 6b metal atom through a carbon atom. As used herein, the term "organic radical" refers to hydrocarbyl radicals such as alkyl, alkenyl, aryl, aralkyl and alkaryl radicals and the like. Exemplary hydrocarbyl radicals include, but are not limited to, methyl, ethyl, propyl, butyl, amyl, isoamyl, hexyl, neopentyl, isobutyl, heptyl, octyl, nonyl, decyl, cetyl, phenyl, benzyl and other similar groups. Additionally, organosilyl groups which are bonded to the Group 6b metal atom(s) through a carbon atom can be used as the organic radical. Trimethylsilyl methyl, i.e., $(CH_3)_3SiCH_2$—, and the like are examples of such organosilyl groups. If more than one hydrocarbyl group is bonded to the metal atom, they can be independent or linked, i.e., they can form a 3-, 4-, 5-, 6-, or 7-membered metallocycle. One object of this invention is to provide a catalyst and a process for producing linear, high density polyethylene with high molecular weight and narrow molecular weight distribution, using the Group 6b metal compounds of this invention.

Examples of the Group 6b metal compounds useful in this invention include, but are not limited to, compounds having the following general formulas:

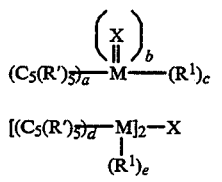

$$[(C_5(R')_5)_{\overline{a}}-M]_2-X \qquad (II)$$
$$\qquad\qquad\qquad |$$
$$\qquad\qquad\qquad (R^1)_e$$

wherein M is a Group 6b metal such as chromium, molybdenum and tungsten;
$(C_5(R')_5)$ is an unsubstituted or substituted cyclopentadienyl ring;
R' is at each independent occurrence hydrogen, a hydrocarbyl radical having 1–20 carbon atoms, or adjacent R' groups may together form one or more hydrocarbyl rings;
X is at each independent occurrence O, S, N—R, N—H, P—R or P—H;
$R^1$ is a hydrocarbyl radical having 1–20 carbon atoms (for example, a monovalent saturated aliphatic or alicyclic radical or a monovalent aromatic radical, or combinations thereof), or an organosilyl group, such as trimethylsilylmethyl;
R is at each independent occurrence hydrogen or a hydrocarbyl radical having 1–20 carbon atoms (such as a monovalent saturated aliphatic or alicyclic radical or a monovalent aromatic radical);
a=1 or 2, b=1 or 2, c=1 or 2 with the proviso that when b=1 then a+c=3 and when b=2 then a+c=2; and d=1 or 2, e=1 or 2 and d+e=3.

Examples of compounds having formula (I) above include, but are not limited to, Cp*Cr(O)$_2$CH$_3$, Cp*Cr(O)(CH$_3$)$_2$, and [Cp*Cr(CH$_3$)$_2$]$_2$O.

In part, the choice of Group 6b metal compound is based on the thermal stability of the compound and its ease of preparation. Of the Group 6b metal compounds useful in this invention, the organochromium compounds are preferred.

The Group 6b metal compounds of this invention may be prepared in a manner similar to that described in Noh, S. et al., *J. Am. Chem. Soc.*, 1992, 114 1892–1893.

In the catalyst systems of the present invention, the Group 6b metal compound is deposited on an inorganic support. Suitable inorganic metal oxide supports include silica, alumina, silica-alumina mixtures, thoria, zirconia, magnesium oxide and similar oxides. Suitable inorganic metal phosphates include aluminum phosphate, zirconium phosphate, magnesium-containing alumina phosphate and alumina aluminum phosphate. Silicas, aluminum phosphates and alumina aluminum phosphates are preferred. Suitable silica supports include Davison 952, Davison 955, Crosfield EP-10 and Crosfield EP17MS. Further examples of useful supports are the following: alumina aluminum phosphates with aluminum to phosphorus ratios of about 5:1 to 1:1 as disclosed in U.S. Pat. Nos. 4,080,311 and 4,219,444; magnesia-alumina-aluminum phosphates as described in U.S. Pat. No. 4,210,560; zinc oxide-cadmium oxide-alumina aluminum phosphates such as those disclosed in U.S. Pat. No. 4,367,067; and the calcium, barium, and/or strontium oxide-alumina-aluminum phosphates described in U.S. Pat. Nos. 4,382,877 and 4,382,878. The acidity of these supports can be adjusted by judicious inclusion of basic metals such as alkali and alkaline earth metals (Ca, Be, Mg, K, Li) to counteract excessive acidity. Other useful supports include magnesium halides, particularly magnesium chloride, such as those described in "Transition Metals and Organometallics as Catalysts for Olefin Polymerization" (1988, Springer-Verlag) edited by W. Kaminsky and H. Sinn and "Transition Metal Catalyzed Polymerizations-Ziegler-Natta and Metathesis Polymerizations" (1988, Cambridge University Press) edited by R. Quirk.

The supports useful in this invention should have a high surface area. In general, these supports should have the characteristics listed in the following table:

| Property | Broad Range | Preferred Range |
|---|---|---|
| Surface area | 25–600 m²/g | 100–370 m²/g |
| Pore volume | 0.25–4 cm³/g | 0.7–3 cm³/g |
| Mean particle diameter | 30–200 microns | 60–140 microns |

Preferably, the pore size distribution is broad, with a significant percentage of the pores in the macropore range (>500 Angstroms). Preferably, at least 50% of the pores are macropores. It is also desirable that the support be substantially anhydrous before the Group 6b metal compound is deposited on it. Thus, it is desirable to calcine the support prior to deposition of the Group 6b metal compound.

The supported catalysts of this invention are readily prepared by techniques well known in the art. For example, a solution of the Group 6b metal compound in aliphatic, aromatic or cycloaliphatic hydrocarbons, or ethers such as diethyl ether or tetrahydrofuran can be stirred with the support until the Group 6b metal compound is adsorbed on or reacted with the support. The amount of Group 6b metal compound relative to the amount of support will vary considerably depending upon such factors as the particle size of the support, its pore size and surface area, the solubility of the Group 6b metal compound in the solvent employed, and the amount of Group 6b metal compound which is to be deposited on the support. However, in general the amount of Group 6b metal compound used is adjusted so that the final metal content (calculated as the element), relative to the support, is in the range of from about 0.01 to about 10 weight percent. In most cases, the most desirable level is in the range of about 0.1 to about 5 weight percent.

Activities for the catalyst systems of the present invention are greater than 3,000 grams of polymer per gram of chromium metal per hour ("g/g Cr/hr"), preferably greater than 30,000 g/g Cr/hr.

It has been found that the activity of many of the supported Group 6b metal compounds of this invention is significantly increased when they are employed in conjunction with a co-catalyst. The co-catalysts useful in the practice of the present invention are Group 2 and Group 3 metal alkyls. As used herein, the term "Group 2 and Group 3 metal alkyls" refers to compounds containing a metal from Group 2 or Group 3 of the Periodic Table (such as Mg, Zn, B, or Al) to which is bonded at least one alkyl group, preferably a $C_1$ to $C_8$ alkyl group. Suitable Group 2 and Group 3 metal alkyls include dialkyl magnesium, dialkyl zinc, trialkylboranes, and aluminum alkyls. Suitable aluminum alkyls include trialkylaluminums (such as trimethylaluminum, triethylaluminum, triisobutylaluminum and trioctylaluminum). Trialkylaluminums with alkyl groups of four carbons or greater are preferred. Other aluminum alkyls useful in the practice of the present invention include alkylaluminum alkoxides (such as diethylaluminum ethoxide and ethylaluminum diethoxide), and alkylaluminum halides (such as diethylaluminum chloride, diethylaluminum bromide, diethylaluminum iodide, diethylaluminum fluoride, ethyl aluminum dichloride, ethyl aluminum dibromide, ethyl aluminum diiodide, ethyl aluminum difluoride, and ethyl aluminum sesquichloride).

Other suitable aluminum alkyls are aluminoxanes, including those represented by the general formula $(R—Al—O)_n$ for the cyclic form and $R(R—Al—O)_n—AlR_2$ for the linear form. In these formulas, R is, at each independent occurrence, an alkyl group (such as methyl, butyl, isobutyl and the like) preferably with more than two carbon atoms, more preferably with 3–5 carbon atoms, and n is an integer, preferably from 1 to about 20. Most preferably, R is an isobutyl group. Mixtures of linear and cyclic aluminoxanes may also be used. Examples of aluminoxanes useful in this invention include, but are not limited to, ethyl aluminoxane, isobutyl aluminoxane, and methyl aluminoxane. Aluminoxanes (also known as "alumoxanes") suitable for use in this invention are described in Pasynkiewicz, "Alumoxanes: Synthesis, Structure, Complexes and Reactions," Polyhedron 9, p 429 (1990), which is incorporated by reference herein in its entirety.

The preferred Group 2 and Group 3 metal alkyls are the aluminoxanes and the trialkylaluminums.

When used, the Group 2 and Group 3 metal alkyls are used in a Group 2 or 3 metal alkyl to Group 6b metal compound mole ratio of from about 1:1 to about 1000:1. The preferred mole ratio is from about 10:1 to about 200:1.

The catalyst systems of the present invention may be used in either slurry or gas phase polymerization processes. After the catalysts have been formed, the polymerization reaction is conducted by contacting the monomer charge with a catalytic amount of the catalyst at a temperature and at a pressure sufficient to initiate the polymerization reaction. If desired, an organic solvent may be used as a diluent and to facilitate materials handling. The polymerization reaction is carried out at temperatures of from about 30° C. or less up to about 200° C. or more, depending to a great extent on the operating pressure, the pressure of the entire monomer charge, the particular catalyst being used, and its concentration. Preferably, the temperature is from about 30° C. to about 125° C. The pressure can be any pressure sufficient to initiate the polymerization of the monomer charge, and can be from atmospheric up to about 1000 psig. As a general rule, a pressure of about 20 to about 800 psig is preferred.

When the catalyst is used in a slurry-type process, an inert solvent medium is used. The solvent should be one which is inert to all other components and products of the reaction system, and be stable at the reaction conditions being used. It is not necessary, however, that the inert organic solvent medium also serve as a solvent for the polymer produced. The inert organic solvents which may be used include saturated aliphatic hydrocarbons (such as hexane, heptane, pentane, isopentane, isooctane, purified kerosene and the like), saturated cycloaliphatic hydrocarbons (such as cyclohexane, cyclopentane, dimethylcyclopentane, methylcyclopentane and the like), aromatic hydrocarbons (such as benzene, toluene, xylene and the like), and chlorinated hydrocarbons (such as chlorobenzene, tetrachloroethylene, o-dichlorobenzene and the like). Particularly preferred solvents are cyclohexane, pentane, isopentane, hexane and heptane.

When the catalyst is used in a gas phase process, it is suspended in a fluidized bed with, e.g., ethylene. Temperature, pressure and ethylene flow rates are adjusted so that to maintain acceptable fluidization of the catalyst particles and resultant polymer particles. Further descriptions of such a fluidized bed may be found in British Patent No. 1,253,063, to Karapinka, which is incorporated by reference herein.

The term molecular weight distribution ("MWD"), as used herein, is the weight average molecular weight ("$M_w$") divided by the number average molecular weight ("$M_n$"), i.e., $M_w/M_n$. The polymers produced in accordance with the present invention using silica supported catalysts have a MWD greater than 10, preferably greater than 15, and more preferably greater than 20. These polymers, which have high MWD's, have improved ease of processing, better melt behavior, and other desirable properties such as impact resistance and environmental stress crack resistance. Large blow molded products are superior when made with high MWD polymers. Additionally, film is more puncture resistant when made from polymer with a high MWD. The polymers made in accordance with this invention using alumina aluminum phosphate supported catalysts possess high molecular weight and a more narrow MWD, making them useful in such applications as injection molding.

It has quite surprisingly been found that when the catalyst systems of this invention are used to produce ethylene homopolymers, the resulting polyethylenes are highly linear, whereas ethylene homopolymers prepared using similar catalyst systems contain significant amounts of side chain branching. This is demonstrated by $^{13}C$ NMR analysis where, for example, polyethylene prepared in accordance with the present invention has essentially no side chain branches ("SCB") per 1000 carbon atoms in the polyethylene. In contrast, polyethylene prepared using bis -(cyclopentadienyl) chromium (II) (chromocene) supported on $Al_2O_3.AlPO_4$ are reported to contain 0.6 to 0.7 mole percent of side chain branches (see U.S. Pat. No. 4,424,139).

The following examples are intended to further illustrate the present invention, and are not intended to limit its scope.

EXAMPLE 1

PREPARATION OF SUPPORTED CATALYSTS

Silica supports were purchased from W. R. Grace & Co., and included Davison 952 and Davison 955 silicas. These silicas have the following properties:

| Property | Davison 952 | Davison 955 |
|---|---|---|
| Surface area | 340 m$^2$/g | 300 m$^2$/g |
| Pore volume | 1.68 cm$^3$/g | 1.60 cm$^3$/g |
| Mean particle diameter | 110 microns | 40 microns |

The alumina aluminum phosphate supports used in the following examples were prepared by the procedure of Example 1 in U.S. Pat. No. 4,080,311, issued Mar. 21, 1978 to Kehl, which patent is incorporated by reference herein. The product had an $Al_2O_3$ to $AlPO_4$ ratio of 1:2.

All catalysts were prepared in a similar manner. Details for Cp*Cr(O)CH$_3$)$_2$ are as follows:

Cp*Cr(O)(CH$_3$)$_2$ (0.025 g) was dissolved in 10 ml of pentane and treated all at once with 0.750 g of $Al_2O_3$.$AlPO_4$. The resulting solution was stirred for 15 minutes resulting in a solid and a clear supernatant. The solid was collected, washed with 2×10 ml of pentane and dried under vacuum to a free-flowing powder.

EXAMPLE 2

ETHYLENE POLYMERIZATION USING SUPPORTED CATALYST

Polymerization runs were conducted in 1 or 2 liter autoclave reactors under particle form (slurry) conditions using between 300 and 500 ml heptane as diluent, and a weighed amount of catalyst (typically 0.050 to 0.250 g). Run times of 0.5 to 2.0 hours were normally employed. For example, in a typical run, 0.075 g of the supported catalyst of Example 1 was charged to a one-liter autoclave along with 300 ml of heptane. Polyisobutylaluminoxane (0.3 ml of a 1.0M heptane solution, prepared by slow hydrolysis of triisobutylaluminum with 1.0 equivalents of H$_2$O as in Example 3 of U.S. Pat. No. 4,665,208, issued May 12, 1987 to Welborn et al., which patent is incorporated by reference herein) was added to the stirred reactor as cocatalyst. The reactor temperature and pressure were adjusted to 80° C. and 550 psi (with ethylene), respectively. The ethylene was supplied on demand from a pressurized reservoir. After 2.0 hours, the reaction was stopped by rapidly cooling the reactor and venting the pressure. The polymer produced was washed with isopropanol and acetone, and dried under vacuum to yield 38 g of white, granular solid. The results of these polymerizations are indicated in Tables I–VI.

TABLE I

POLYMERIZATION DATA FOR [Cp*Cr(CH$_3$)$_2$]$_2$O

| Run | Support | u mol Cr | Co-catalyst | Al:Cr$^a$ | C$_2$H$_4$ psig | Temp, °C. | Activity$^b$ |
|---|---|---|---|---|---|---|---|
| 1 | ALPO$^c$ | 32 | None | — | 550 | 80 | ~0 |
| 2 | ALPO | 32 | IBAO$^d$ | 16 | 550 | 80 | 120,000 |

$^a$Mole ratio
$^b$Activity is expressed in g. polymer/g. Cr/hr.
$^c$ALPO = $Al_2O_3.AlPO_4$ dehydrated at 400° C. for 24 hours.
$^d$IBAO = Isobutylaluminoxane

TABLE II

ANALYTICAL DATA FOR POLYETHYLENES PREPARED WITH [Cp*Cr(CH$_3$)$_2$]$_2$O

| Run | T$_m$, °C. | Density g/cc | MW$^c$ × 10$^{-3}$ | MWD |
|---|---|---|---|---|
| 2 | 136.9 | 0.9333 | 1,124 | 3.08 |

$^c$Determined by GPC.

TABLE III

POLYMERIZATION DATA FOR Cp*Cr(O)(CH$_3$)$_2$

| Run | Support | u mol Cr | Co-catalyst | Al:Cr | C$_2$H$_4$ psig | Temp, °C. | Activity |
|---|---|---|---|---|---|---|---|
| 3 | ALPO | 10.7 | IBAO | 28 | 550 | 80 | 34,000 |

TABLE IV

ANALYTICAL DATA FOR POLYETHYLENES PREPARED WITH Cp*Cr(O)(CH$_3$)$_2$

| Run | T$_m$, °C. | Density g/cc | MW × 10$^{-3}$ | MWD |
|---|---|---|---|---|
| 3 | 137.6 | 0.9367 | 933.6 | 4.22 |

TABLE V

POLYMERIZATION DATA FOR Cp*Cr(O)$_2$CH$_3$

| Run | Support | u mol Cr | Co-catalyst | Al:Cr | C$_2$H$_4$ psig | Temp, °C. | Activity |
|---|---|---|---|---|---|---|---|
| 4 | ALPO | 26 | IBAO | 20 | 550 | 80 | 58,000 |
| 5 | ALPO | 26 | IBAO | 20 | 550 | 80 | 50,000 |

TABLE VI

ANALYTICAL DATA FOR POLYETHYLENES PREPARED WITH Cp*Cr(O)$_2$CH$_3$

| Run | T$_m$, °C. | Density g/cc | MW × 10$^{-3}$ | MWD |
|---|---|---|---|---|
| 4 | 138.8 | 0.9373 | 961.1 | 13.58 |
| 5 | 137.3 | 0.9383 | 988 | 15.72 |

EXAMPLE 3

GAS PHASE POLYMERIZATION

The procedure of Example 2 is repeated in a 2 liter, stirred autoclave using the supported catalysts of this invention, except that heptane is not added to the autoclave. The reactor temperature and pressure are adjusted to 85° C. and 550 psi (with ethylene), respectively. A white, granular polymer is produced.

What is claimed is:

1. A catalyst system for the homopolymerization or copolymerization of alpha-olefins having 2–8 carbon atoms, said catalyst system comprising a cyclopentadienyl chromium compound having at least one thio, imido or phosphido group bonded directly to the chromium, and at least one organic radical bonded to the chromium through a carbon atom, said chromium compound being supported on an inorganic support.

2. The catalyst system of claim 1 wherein the cyclopentadienyl is alkyl or phenyl substituted cyclopentadienyl.

3. The catalyst system of claim 2 wherein the substituted cyclopentadienyl is pentamethylcyclopentadienyl.

4. The catalyst system of claim 1 wherein the chromium compound has the formula:

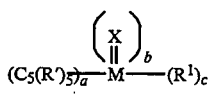
(I)

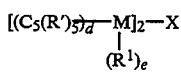
(II)

wherein M is essentially chromium;

$(C_5(R')_5)$ is an unsubstituted or substituted cyclopentadienyl ring;

R' is at each independent occurrence hydrogen, a hydrocarbyl radical having 1-20 carbon atoms, or adjacent R' groups may together form one or more hydrocarbyl rings;

X is at each independent occurrence S, N—R, N—H, P—R or P—H;

$R^1$ is a hydrocarbyl radical having 1-20 carbon atoms, or an organosilyl group;

R is at each independent occurrence hydrogen or a hydrocarbyl radical having 1-20 carbon atoms;

a=1 or 2, b=1 or 2, c=1 or 2 with the proviso that when b=1 then a+c=3 and when b=2 then a+c=2; and d=1 or 2, e=1 or 2 and d+e=3.

5. The catalyst system of claim 4 wherein $(C_5(R')_5)$ is pentamethylcyclopentadienyl.

6. The catalyst system of claim 1 wherein the support is an inorganic metal oxide or inorganic metal phosphate.

7. The catalyst system of claim 6 wherein the support is selected from the group consisting of alumina, silica, silica-alumina, aluminum phosphate, zirconium phosphate, and alumina aluminum phosphate.

8. The catalyst system of claim 7 wherein the support is alumina aluminum phosphate.

9. The catalyst system of claim 1 wherein the chromium of said chromium compound is present in an amount within the range of 0.1 to 10 weight percent based on the weight of said inorganic support.

10. The catalyst system of claim 1 which further comprises a cocatalyst selected from Group 2 or 3 metal alkyl compounds.

11. The catalyst system of claim 10 wherein the cyclopentadienyl is alkyl or phenyl substituted cyclopentadienyl.

12. The catalyst system of claim 11 wherein the substituted cyclopentadienyl is pentamethylcyclopentadienyl.

13. The catalyst system of claim 10 wherein the chromium compound has the formula:

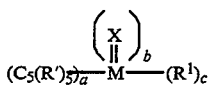
(I)

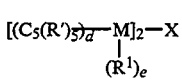
(II)

wherein M is essentially chromium;

$(C_5(R')_5)$ is an unsubstituted or substituted cyclopentadienyl ring;

R' is at each independent occurrence hydrogen, a hydrocarbyl radical having 1-20 carbon atoms, or adjacent R' groups may together form one or more hydrocarbyl rings;

X is at each independent occurrence S, N—R, N—H, P—R or P—H;

$R^1$ is a hydrocarbyl radical having 1-20 carbon atoms, or an organosilyl group;

R is at each independent occurrence hydrogen or a hydrocarbyl radical having 1-20 carbon atoms;

a=1 or 2, b=1 or 2, c=1 or 2 with the proviso that when b=1 then a+c=3 and when b=2 then a+c=2; and d=1 or 2, e=1 or 2 and d+e=3.

14. The catalyst system of claim 13 wherein $(C_5(R')_5)$ is pentamethylcyclopentadienyl.

15. The catalyst system of claim 10 wherein the support is an inorganic metal oxide or inorganic metal phosphate.

16. The catalyst system of claim 15 wherein the support is selected from the group consisting of alumina, silica, silica-alumina, aluminum phosphate, zirconium phosphate, and alumina aluminum phosphate.

17. The catalyst system of claim 16 wherein the support is alumina aluminum phosphate.

18. A catalyst system according to claim 10 wherein the chromium of said chromium compound in present in an amount within the range of 0.1 to 10 weight percent based on the weight of said inorganic support.

19. The catalyst system of claim 10 wherein the Group 2 or Group 3 metal alkyl compound is an alkylaluminum compound.

20. The catalyst system of claim 19 wherein the alkylaluminum compound is selected from the group consisting of trialkylaluminum compounds, alkylaluminum alkoxides, alkylaluminum halides and aluminoxanes.

21. The catalyst system of claim 20 wherein the alkylaluminum compound in an aluminoxane or trialkylaluminum compound.

22. A catalyst system according to claim 21 wherein the alkylaluminum compound is isobutylaluminoxane.

* * * * *